United States Patent
Chen et al.

(10) Patent No.: US 11,895,562 B2
(45) Date of Patent: Feb. 6, 2024

(54) DETERMINING APPROXIMATE POSITION OF A USER MACHINE BASED ON INERNET (IP) ADDRESS

(71) Applicant: TruePoint Technology Inc., Beijing (CN)

(72) Inventors: Kongzhe Chen, Beijing (CN); Guangyu Zhou, Beijing (CN); Lei Huang, Beijing (CN)

(73) Assignee: TRUEPOINT TECHNOLOGY INC., Beijing (CN)

( * ) Notice: Subject to any disclaimer, the term of this patent is extended or adjusted under 35 U.S.C. 154(b) by 162 days.

(21) Appl. No.: 17/451,925

(22) Filed: Oct. 22, 2021

(65) Prior Publication Data

US 2022/0295227 A1      Sep. 15, 2022

(30) Foreign Application Priority Data

Mar. 12, 2021   (CN) .......................... 202110266951.3

(51) Int. Cl.
   *H04W 4/029*   (2018.01)
   *G01S 19/44*   (2010.01)
   (Continued)

(52) U.S. Cl.
   CPC ............. *H04W 4/029* (2018.02); *G01S 19/44* (2013.01); *H04W 4/025* (2013.01); *H04W 64/003* (2013.01)

(58) Field of Classification Search
   CPC ... H04W 4/029; H04W 4/025; H04W 64/003; H04W 64/00; H04W 4/02; H04W 80/00;
   (Continued)

(56) References Cited

U.S. PATENT DOCUMENTS 5,477,458 A * 12/1995 Loomis .......................... 364/449
7,613,468 B2 * 11/2009 Hamilton et al. ......... 455/456.1
(Continued)

FOREIGN PATENT DOCUMENTS

CN     111610542 A     9/2020
CN     111694030 A     9/2020

OTHER PUBLICATIONS

Tang et al.: Area Enhancement System Based On Real-time Ionospheric Modeling Method Of Puncture Point; CN 106338738 A. (Year: 2017).*

(Continued)

*Primary Examiner* — Meless N Zewdu
(74) *Attorney, Agent, or Firm* — HAUPTMAN HAM, LLP

(57) ABSTRACT

The present invention discloses a method, an apparatus, a computer storage medium, and a terminal for processing positioning information. According to embodiments of the present invention, through the IP (Internet Protocol) address of the user machine, the approximate position of the user machine is determined according to the obtained IP address; and a set of correction data of a virtual reference station to be sent to the user machine is determined according to the approximate position of the user machine. In the embodiments of the present invention, the user machine does not need to report its position, such that privacy issues related to the position report are eliminated; in addition, the processing of the virtual reference station is converted from two-way (Continued)

---

101 — Obtaining an Internet Protocol (IP) address when a user machine is connected to a network RTK server to perform RTK process in real-time 102 — Determining an approximate location of the user machine according to the IP address obtained 103 — Determining, according to the approximate position of the user machine, a set of correction data of a virtual reference station to be sent to the user machine communication to one-way communication, thereby simplifying the communication interaction process of traditional Network RTK (Real-Time Kinematic) service which may be nationwide.

8 Claims, 1 Drawing Sheet

(51) Int. Cl.
*H04W 4/02* (2018.01)
*H04W 64/00* (2009.01)

(58) Field of Classification Search
CPC ... H04W 80/02; H04W 80/04; H04W 80/045; H04W 80/06; H04W 88/00; H04W 88/02; H04W 88/08; G01S 19/44; G01S 19/073; G01S 19/071; G01S 1/00; G01S 19/00; G01S 19/01; G01S 19/31; G01S 19/39; G01S 19/396; G01S 19/40; G01S 19/41; G01S 19/42; G01S 19/45; G01S 2201/00; G01S 2201/01; G01S 2201/02; G01S 2201/025; G01S 2205/00; G01S 2205/001; G01S 2205/01; G01S 2205/02; G01S 2205/06; G16Y 10/60; G16Y 10/05; G16Y 10/40; G16Y 20/00; G16Y 20/10; G16Y 30/00; G16Y 30/10; G16Y 40/00; G16Y 40/10; G16Y 40/20; G16Y 40/35; G16Y 40/40; G16Y 40/50; G16Y 40/60; G06F 9/34; G06F 21/101; G06F 21/1011; H04L 12/4641; H04N 2201/3204; H04N 2201/3207; H04N 21/63; H04N 21/2265

See application file for complete search history.

(56) References Cited

U.S. PATENT DOCUMENTS

| | | | |
|---|---|---|---|
| 10,666,079 B2* | 5/2020 | Son et al. | H02J 7/0072 |
| 2005/0064878 A1* | 3/2005 | O'Meagher | 455/456.1 |
| 2015/0057028 A1* | 2/2015 | Rudow et al. | H04W 4/028 |
| 2018/0252818 A1* | 9/2018 | Sato et al. | G01S 19/28 |
| 2019/0110270 A1* | 4/2019 | Chen | H04W 64/003 |
| 2019/0324149 A1* | 10/2019 | Lin | G01S 19/04 |
| 2019/0391276 A1* | 12/2019 | Kroeger et al. | G01S 19/41 |
| 2021/0033735 A1* | 2/2021 | Kleeman | G01S 19/071 |
| 2021/0089040 A1* | 3/2021 | Ebrahimi Afrouzi et al. G05D 1/0214 | |
| 2022/0137235 A1* | 5/2022 | Dundorf et al. | G01S 19/243 |

OTHER PUBLICATIONS

Sha X et al.: Hybrid Cloud Based Centimeter-sized Real-time Positioning System Has Private Cloud That Broadcast Differential Correction Data Of Grid Of Virtual Reference Station To Terminal Device According To Probability Position Of Terminal Upload; CN 107872516 A. (Year: 2018).*

First Office Action issued in Chinese Patent Application No. 202110266951.3; dated Aug. 15, 2022; 18 pgs.

Second Office Action issued in Chinese Patent Application No. 202110266951.3; dated Sep. 15, 2022; 16 pgs.

* cited by examiner

DETERMINING APPROXIMATE POSITION OF A USER MACHINE BASED ON INERNET (IP) ADDRESS

RELATED APPLICATIONS

The present application claims priority from Chinese Application Number 2021102669513, filed Mar. 12, 2021, the disclosure of which is hereby incorporated by reference herein in its entirety.

TECHNICAL FIELD

The present invention relates to but is not limited to positioning and navigation technologies, and in particular, to a method, an apparatus, a computer storage medium, and a terminal for processing positioning information.

BACKGROUND

With the development of science and technology, many navigation satellite systems such as the Global Positioning System (GPS), the BeiDou Navigation Satellite System (BDS), the Global Navigation Satellite System (GLONASS), and the Galileo Navigation Satellite System (Galileo) are used to provide positioning services to users. Satellite navigation and positioning have been widely applied in fields including vehicle navigation, surveying and mapping, precision agriculture, intelligent robots, unmanned aerial vehicles, and unmanned driving. Although the accuracy of the orbital clock error of the satellite navigation system has been constantly improved and more and more satellites are available, the combined effect of errors of the satellite orbit, the clock error, the ionosphere, the troposphere is still more than one meter, and in the case of no external precise data, the positioning error of single point positioning (SPP) is still more than one meter, which cannot satisfy the centimeter-level, decimeter-level, and submeter-level accuracy requirements in applications including surveying and mapping, precision agriculture, unmanned driving or the like. In order to mitigate the effect of these errors, precise data can be used to improve the positioning accuracy.

At present, precise data can be provided by systems or algorithms such as the Satellite-Based Augmentation System (SBAS), the Differential Global Navigation Satellite System (DGNSS), the Precise Point Positioning (PPP), and the Real-Time Kinematic (RTK); and different positioning accuracies can be achieved depending on the precise data provided by different systems and algorithms. In RTK application, a rover receives correction data including measurements and coordinates from a base station. Satellite clock error is eliminated through the single difference between two stations, the errors of the satellite orbit, the ionosphere, and the troposphere are mitigated, and the residual errors of the troposphere and the ionosphere can be further mitigated through parameter estimation. RTK can achieve single epoch ambiguity resolution through a multi-frequency receiver, and output centimeter level accurate position within seconds. Therefore, the RTK can be widely applied to regions where base stations can be constructed.

RTK processing requires the support of an RTK base station (also known as an RTK reference station). The effective range of the RTK base station is generally less than 50 kilometers, and then, in order to provide correction data (the correction data is a set of data used to correct the positioning error, and the correction data can also be called differential data) for user machines in a wide range, a large number of RTK base stations need to be built. In order to reduce the density of the RTK base stations, network RTK has been proposed. The network RTK constructs a Continuously Operating Reference Station (CORS) network to model the errors of the ionosphere, the troposphere, the satellite orbit in a wide area, so as to reduce the number of the RTK base stations to be built. In the related art, network RTK includes Virtual Reference Station (VRS), Flächen Korrektur Parameter (FKP), and Master Auxiliary Concept (Mac). The VRS requires that the user machine (rover station) and a network RTK server perform two-way communication, the user machine reports its own position, the network RTK server generates a user machine position-based VRS correction according to the user machine position, and the generated VRS correction is sent to the user machine by the network RTK server. The FKP models the ionosphere, the troposphere, the satellite orbit, in a local area, and fits the changes of the errors of the ionosphere, the troposphere, the satellite orbit in the east-west and north-south directions through linear parameters; however, since for the nationwide network, the errors of the ionosphere, the troposphere, the satellite orbit, no longer linearly changes, and parameter fitting cannot be performed through related technologies, therefore the FKP cannot be applied to the nationwide network. The Mac server broadcasts the observation of a master station and the correction of all slave stations with respect to the master station, so that for a CORS network including thousands of tracking stations, huge data cannot be transmitted in real time; in addition, the satellites tracked by the slave stations and the master station are different due to the long distance, and the correction of the slave stations with respect to the master station only includes the satellites that are common-viewed by the slave stations and the master station, so that the correction available to the user machine is reduced, and even if the user machine receives the correction, RTK performance degrades. In view of the above, the FKP and the Mac are only applicable to local areas and cannot be applied to any nationwide network, and only the VRS can be applied to the nationwide network.

The VRS requires the support of two-way communication, and has high requirements in server bandwidth and calculation resources; and with the linear increase in the number of user machines, the calculation pressure of the network RTK server is also increasing. In addition, the VRS correction data has to be received by the rover station timely, otherwise, the correction data cannot be used for RTK process. The user machine requests the VRS correction data at a frequency of 1 hertz (Hz), and the server needs to generate the corresponding VRS correction data for all user machines within 1 second. In order to resolve the problem above, in the related art, grid division is performed on the service area of the network RTK, the VRS correction data at the center of a grid is calculated for each grid obtained after division, and the user machines in each grid can share the same set of VRS correction data. Through grid division, the server does not need to generate the VRS correction data for each user machine. The VRS correction data to be generated is related to the number of grids included in the network RTK coverage. The grid division reduces the calculation amount of the network RTK server, and can also satisfy the requirements of the rover station in the real-time capability for the VRS correction data. However, the sending of the VRS correction data by the network RTK server requires the user machine to report the user machine position that involves user privacy, especially in application to intelligent driving, logistics, smart agriculture, and unmanned aerial vehicles, and the position needs to be reported continuously. Because the privacy issue that may be caused by position reporting, some users gives up the use of the network RTK and instead, they start to use services that do not require the users to report the position but are worse in performance. The implementation of the VRS in the case of protecting the user privacy has become a problem to be solved.

SUMMARY

The following is an overview of the subject matter to be described in detail herein. This overview is not intended to limit the scope of protection of the claims.

Embodiments of the present invention provide a method, an apparatus, a computer storage medium, and a terminal for processing positioning information, and can achieve VRS while user privacy is protected.

The embodiments of the present invention further provide a method for processing positioning information, including:
  obtaining an Internet Protocol (IP) address of a user machine connected to a network RTK server;
  determining a user machine approximate position according to the obtained IP address; and
  determining, according to the user machine approximate position, a VRS correction data to be sent to the user machine.

According to another aspect, the embodiments of the present invention further provide a computer storage medium, where a computer program is stored in the computer storage medium, and when the computer program is executed by a processor, the foregoing method for processing positioning information is implemented.

According to yet another aspect, the embodiments of the present invention further provide a terminal, including a memory and a processor, where a computer program is stored in the memory;
  the processor is configured to execute the computer program in the memory; and
  when the computer program is executed by the processor, the foregoing method for processing positioning information is implemented.

According to still another aspect, the embodiments of the present invention further provide an apparatus for processing positioning information, including an acquisition unit, an approximate position determination unit, and a correction data determination unit, where the acquisition unit is configured to obtain an IP address of a user machine connected to a network to perform RTK processing in real time;
  the approximate position determination unit is configured to determine an approximate position of a user machine according to the obtained IP address; and
  the correction data determination unit is configured to determine, according to the approximate position of the user machine, a correction data of a virtual reference station to be sent to the user machine.

In the embodiments of the present invention, a user machine approximate position is determined according to the obtained IP address of the user machine; and a VRS correction data to be sent to the user machine is determined according to the user machine approximate position. According to the embodiments of the present invention, the user machine does not need to report the position, such that privacy issues related to position reporting are eliminated; in addition, processing of the VRS is converted from two-way communication to one-way communication, thereby simplifying a communication interaction process of an RTK service of a nationwide network.

Other features and advantages of the present invention will be explained later in the description, and are partially obvious according to the description or understood by implementing the present invention. The purpose and other advantages of the present invention can be achieved and obtained through the structures specifically indicated in the description, claims and drawings.

BRIEF DESCRIPTION OF THE DRAWINGS

The drawings are used to provide further understanding to the technical solutions of the present invention, constitutes a part of the description, is used to explain the technical solutions of the present invention together with embodiments of the present application, and does not constitute a limitation to the technical solutions of the present invention.

DETAILED DESCRIPTION

To understand the purpose, the technical solutions and the advantages of the present invention more clearly, embodiments of the present invention are described in detail below with reference to the drawings. It should be noted that the embodiments in the present application and the features in the embodiments may be combined with each other in the case of no conflict.

The steps shown in the flow chart of the drawings may be executed in a computer system such as a set of computer-executable instructions. Moreover, although a logical sequence is shown in the flow chart, in some cases, the steps shown or described may be executed in a different sequence.

Figure 1:
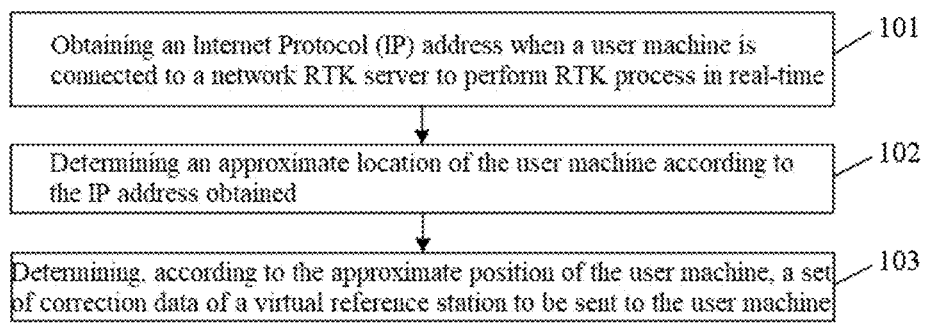
FIG. 1 is a flow chart of a method for processing positioning information according to embodiments of the present invention.

FIG. 1 is a flow chart of a method for processing positioning information according to the embodiments of the present invention. As shown in FIG. 1, the method includes the following steps.

At step 101, an IP address of a user machine connected to a network RTK server is obtained.

The user machine in the embodiments of the present invention includes a VRS user machine; with reference to related art, the user machine interacts with the network RTK server over a wired network or a wireless network such as a fourth-generation mobile communication technology (4G) network and a fifth-generation mobile communication technology (5G) network; before the interaction with the network RTK server, the user machine is connected to the network; and a communication service provider assigns an IP address to the user machine connected to the network.

At step 102, a user machine approximate position is determined according to the obtained IP address.

The user machine approximate position in the embodiments of the present invention includes: user machine approximate coordinates generally refer to the longitude and latitude of the user machine; and the approximate position is a term well-known to persons skilled in the art. Details are not described herein again.

At step 103, a VRS correction data to be sent to the user machine is determined according to the user machine approximate position.

In one exemplary example, according to the embodiments of the present invention, the processing of obtaining the IP address and determining the VRS correction data can be executed by the network RTK server.

In the embodiments of the present invention through an IP address of a user machine, a user machine approximate position is determined according to the obtained IP address; and a VRS correction data to be sent to the user machine is determined according to the user machine approximate position. According to the embodiments of the present invention, the user machine does not need to report its position, and after the approximate position is determined based on the IP address, the VRS correction data can be determined through the approximate position, such that privacy issues related to position reporting are eliminated; in addition, processing of the VRS is converted from two-way communication to one-way communication, thereby simplifying a communication interaction process of an RTK service of a nationwide network.

In one exemplary example, according to the embodiments of the present invention, the determining, according to the user machine approximate position, the VRS correction data to be sent to the user machine includes:
  determining, according to the user machine approximate position, a grid where the user machine is located; and
  determining, according to the determined grid where the user machine is located, the VRS correction data of the grid to be sent to the user machine.

In one exemplary example, after the IP address is obtained, according to the embodiments of the present invention, the user machine approximate position can be determined by a third-party IP position service provider according to a correspondence between the IP address and the approximate position. In one exemplary example, according to the embodiments of the present invention, the correspondence between the IP address and the approximate position may be stored in the network RTK server, and the user machine approximate position is determined by the network RTK server according to the IP address. In one exemplary example, according to the embodiments of the present invention, the user machine approximate position is determined based on the IP address by using related art. For example, the position of the user machine accurate up to a block is obtained through location based service for urban emergency response (E911) and the position is determined as the user machine approximate position, and the user machine approximate position accurate to a city is determined through civil service. The user machine approximate positions obtained with the foregoing methods can satisfy user machine position requirements of network RTK.

In one exemplary example, after the grid where the user machine is located is determined, according to the embodiments of the present invention, with reference to the related art, based on the determined grid where the user machine is located, the VRS correction data of the grid can be determined and will be sent to the user machine.

In one exemplary example, according to the embodiments of the present invention, the determining, according to the determined user machine approximate position, the grid where the user machine is located includes:
  determining, according to the latitude of the user machine approximate position, based on a preset policy, the grid where the user machine is located.

In the related art, grid division is performed depending on regions. For low-latitude and high-latitude regions where the ionosphere is active, the service range of an RTK base station generally does not exceed 20 kilometers, and thus the grid side length generally does not exceed 20 kilometers; and for mid-latitude regions where the ionosphere is relatively calm, the service range of the RTK base station can reach up to 50 kilometers, and thus the grid side length can be set to more than 20 kilometers. In the embodiments of the present invention, the grid setting principle is analyzed, and the grid where the user machine is located which conforms to the grid setting is determined according to the latitude of the user machine approximate position.

In one exemplary example, according to the embodiments of the present invention, the determining, based on the preset policy, the grid where the user machine is located includes:
  determining a first grid where the user machine approximate position is located;
  when the user machine approximate position is in a mid-latitude region, determining the first grid as the grid where the user machine is located; and
  when the user machine approximate position is in a low-latitude or high-latitude region, determining the first grid and the second grids adjacent to the first grid as the grid where the user machine is located.

In one exemplary example, according to the embodiments of the present invention, the second grids may include some or all grids in directions north, east, south, and west adjacent to the first grid.

According to the embodiments of the present invention, the city where the user machine is located can be accurately determined according to the user machine approximate position obtained through the IP address, with an error of several kilometers to tens of kilometers. For the mid-latitude regions where ionosphere is inactive and the VRS correct data is valid up to 50 kilometers, the first grid where the user machine approximate position is located is determined as the grid where the user machine is located, and the VRS correction data corresponding to the determined grid where the user machine is located is sent to the user machine, thereby satisfying RTK positioning requirements of the user. For low-latitude and high-latitude regions where ionosphere is active and the VRS correction data is only valid for 20 kilometers, according to the embodiments of the present invention, in order to counteract the error of the user machine approximate position, the first grid where the user machine approximate position is located and the second grids adjacent to the first grid are determined as the grid where the user machine is located, the VRS correction data corresponding to the determined grids where the user machine is located are sent to the user machine, and the user machine can select the closest VRS from all VRSs received according to the position of the user machine so as to perform RTK calculation.

In one exemplary example, after the VRS correction data to be sent to the user machine is determined according to the obtained IP address, the method according to the embodiments of the present invention further includes:
  sending the determined VRS correction data to the user machine.

In one exemplary example, before the IP address of the user machine connected to the network RTK server is obtained, the method according to the embodiments of the present invention further includes:
  determining whether the user machine sends an actual position to the network RTK server;
  when the user machine sends the actual position to the RTK server, determining, according to the actual position, the grid where the user machine is located; and
  determining the VRS correction data through the grid where the user machine is located which is determined according to the actual position; and when the user machine does not send the actual position to the RTK server, triggering execution of processing of obtaining the IP address of the user machine connected to the network RTK server.

In the embodiments of the present invention, for a moving user machine allowed to send the actual position, such as an intelligent robot, an unmanned aerial vehicle, and an autonomous driving vehicle, when the user machine sends the actual position to the network RTK server over the 4G or 5G network, according to the embodiments of the present invention, the VRS correction data determined according to the actual position is sent to the user machine.

In one exemplary example, after the determined VRS correction data is sent to the user machine, the method according to the embodiments of the present invention further includes:

determining whether the IP address of the user machine is updated;

re-determining a new approximate position of the user machine according to the updated IP address; and re-determining, according to the re-determined approximate position of the user machine, a new VRS to be selected and its correction data to be sent to the user machine.

When the user machine sends a handover from one base station to another base station or moves from one city to another city, the communication service provider will re-assign an IP address to the user machine. According to the embodiments of the present invention, a new approximate position of the user machine is re-determined according to the updated IP address, and a new VRS is re-determined according to the re-determined approximate position of the user machine and then the correction data of the new VRS is sent to the user machine.

The embodiments of the present invention further provide a computer storage medium, where a computer program is stored in the computer storage medium, and when the computer program is executed by a processor, the foregoing method for processing positioning information is implemented.

The embodiments of the present invention further provide a terminal, including a memory and a processor, where a computer program is stored in the memory;

the processor is configured to execute the computer program in the memory; and when the computer program is executed by the processor, the foregoing method for processing positioning information is implemented.

Figure 2:
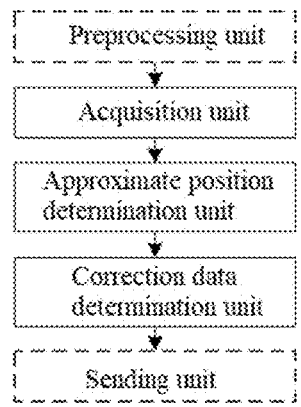
FIG. 2 is a structural block diagram of an apparatus for processing positioning information according to embodiments of the present invention.

FIG. 2 is a structural block diagram of an apparatus for processing positioning information according to the embodiments of the present invention. As shown in FIG. 2, the apparatus includes an acquisition unit, an approximate position determination unit, and a correction data determination unit, where the acquisition unit is configured to obtain an IP address of a user machine connected to a network RTK server;

the approximate position determination unit is configured to determine a user machine approximate position according to the obtained IP address; and the correction data determination unit is configured to determine, according to the user machine approximate position, a VRS correction data to be sent to the user machine.

In the embodiments of the present invention, through an IP address of a user machine; a user machine approximate position is determined according to the obtained IP address; and a VRS correction data to be sent to the user machine is determined according to the user machine approximate position. According to the embodiments of the present invention, the user machine does not need to report the position, such that privacy issues related to position reporting are eliminated; in addition, processing of the VRS is converted from two-way communication to one-way communication, thereby simplifying a communication interaction process of an RTK service of a nationwide network.

In one exemplary example, according to the embodiments of the present invention, the correction data determination unit is configured to:

determine, according the user machine approximate position, a grid where the user machine is located; and determine, according to the determined grid where the user machine is located, the VRS correction data to be sent to the user machine.

In one exemplary example, according to the embodiments of the present invention, the correction data determination unit is configured to determine, according to the determined user machine approximate position, the grid where the user machine is located, including:

determining, according to the latitude of the user machine approximate position, based on a preset policy, the grid where the user machine is located.

In one exemplary example, according to the embodiments of the present invention, the correction data determination unit is configured to determine, based on the preset policy, the grid where the user machine is located, including:

determining a first grid where the user machine approximate position is located;

when the user machine approximate position is in a mid-latitude region, determining the first grid as the grid where the user machine is located; and when the user machine approximate position is in a low-latitude or high-latitude region, determining the first grid and the second grids adjacent to the first grid as the grids where the user machine is located.

In one exemplary example, the apparatus according to the embodiments of the present invention further includes a sending unit configured to:

send the determined VRS correction data to the user machine.

In one exemplary example, the apparatus according to the embodiments of the present invention further includes a preprocessing unit configured to:

determine whether the user machine sends an actual position to the network RTK server;

when the user machine sends the actual position to the RTK server, determine, according to the actual position, the grid where the user machine is located; and determine the VRS correction data through the grid where the user machine is located which is determined according to the actual position; and when the user machine does not send the actual position to the RTK server, trigger execution of processing of obtaining the IP address of the user machine connected to the network RTK server.

In one exemplary example, the acquisition unit in the embodiments of the present invention is further configured to:

determine whether the IP address of the user machine is updated, and when it is determined that the IP address of the user machine is updated, obtain the updated IP address;

the approximate position determination unit is further configured to re-determine the approximate position of the new user machine according to the updated IP address; and the correction data determination unit is further configured to re-determine, according to the re-determined approximate position of the user machine, a new VRS and correction data of the new VRS to be sent to the user machine.

The embodiments of the present invention further provide a rover station, including a receiving unit and a processing unit, where the receiving unit is configured to receive more than one set of VRS correction data; and the processing unit is configured to perform RTK calculation according to the received VRS correction data.

In one exemplary example, the processing unit is configured to: when more than two sets of VRS correction data are received, determine a VRS closest to the rover station from VRSs corresponding to the more than one VRS correction data, and perform RTK calculation according to the VRS correction data of the determined VRS closest to the rover station.

The embodiments of the present invention further provide a system for processing positioning information, including the rover station, the apparatus for processing positioning information, and the user machine.

"Persons of ordinary skill in the art can understand that all or some steps in the method and some or all functional modules/units in the system and apparatus disclosed above can be implemented as software, firmware, hardware, and appropriate combinations thereof. In hardware implementation, the division of the functional modules/units mentioned in the above description does not necessarily correspond to the division of physical components, for example, a physical component may have multiple functions, or a function or step may be executed by a combination of several physical components. Some or all components may be implemented as software executed by a processor such as a digital signal processor or a microprocessor, or implemented as hardware, or implemented as an integrated circuit such as an application specific integrated circuit. Such software may be distributed on a computer-readable medium, and the computer-readable medium may include a computer storage medium (or a non-transitory medium) and a communication medium (or a transitory medium). As is well-known to persons of ordinary skill in the art, the termed computer storage medium includes volatile and nonvolatile media and removable and non-removable media implemented in any methods or techniques for storing information (such as computer-readable instructions, data structures, program modules, or other data). The computer storage medium includes but is not limited to RAM, ROM, EEPROM, flash memory or other memory technologies, CD-ROM, Digital Versatile Disk (DVD) or other optical disk memories, magnetic cassettes, magnetic tapes, magnetic disk memories or other magnetic storage devices, or any other media available to store desired information and accessible to computers. In addition, as is well-known to persons of ordinary skill in the art, the communication medium usually includes computer-readable instructions, data structures, program modules, or other data in modulated data signals such as carriers and other transmission mechanisms, and may include any information delivery media."

The invention claimed is:

1. A method for processing positioning information, comprising:
   obtaining an Internet Protocol (IP) address when a user machine is connected to a Network real-time kinematic (RTK) server in real time;
   determining an approximate location of the user machine according to the IP address obtained; and
   determining, according to the approximate position of the user machine, a set of correction data of a virtual reference station to be sent to the user machine,
   wherein before obtaining the IP address of the user machine connected to the Network RTK server, the method further comprises:
   determining whether the user machine sends an actual position to the network RTK server;
   when the user machine sends the actual position to the RTK server, determining, according to the actual position, a grid where the user machine is located; and determining the correction data of the virtual reference station according to the grid where the user machine is located, according to the actual position; and
   when the user machine does not send the actual position to the RTK server, triggering the process of obtaining the IP address of the user machine connected to the Network RTK server.

2. The method according to claim 1, wherein determining, according to the approximate position of the user machine, the correction data of the virtual reference station to be sent to the user machine comprises:
   determining, according to the approximate position of the user machine, the grid where the user machine is located; and
   determining, according to the determined grid where the user machine is located, the correction data of a virtual reference station located in the grid to be sent to the user machine.

3. The method according to claim 2, wherein determining, according to the approximate position of the user machine, the grid where the user machine is located comprises:
   determining, according to a latitude of the approximate position of the user machine, based on a preset policy, the grid where the user machine is located.

4. The method according to claim 3, wherein determining, based on the preset policy, the grid where the user machine is located comprises:
   determining a first grid where the approximate position of the user machine is located;
   when the approximate position of the user machine is in a mid-latitude region, determining the first grid as the grid where the user machine is located; and
   when the approximate position of the user machine is in a low-latitude or a high-latitude region, determining second grids adjacent to the first grid as the grids where the user machine is located.

5. The method according to claim 1, wherein after determining, according to the IP address obtained, the correction data of the virtual reference station to be sent to the user machine, the method further comprises:
   sending the determined correction data of the virtual reference station to the user machine.

6. The method according to claim 5, wherein after sending the determined correction data of the virtual reference station to the user machine, the method further comprises:
   determining whether the IP address of the user machine is updated;

when the IP address of the user machine is updated, obtaining the updated IP address;

re-determining an approximate position of the user machine according to the updated IP address; and re-determining, according to the re-determined approximate position of the user machine, the correction data of a virtual reference station to be sent to the user machine.

7. A terminal, comprising a memory, a processor, and a computer program is stored in the memory; wherein the processor is configured to execute the computer program in the memory; and when the computer program is executed by the processor, the method for processing positioning information according to claim 1 is implemented.

8. An apparatus for processing positioning information, comprising an acquisition unit, an approximate position determination unit, and a correction data determination unit, wherein the acquisition unit is configured to obtain an Internet Protocol (IP) address of a user machine connected to a Network real-time kinematic (RTK) server in real time;

the approximate position determination unit is configured to determine an approximate position of the user machine according to the IP address obtained; and the correction data determination unit is configured to determine, according to the approximate position of the user machine, a correction data of a virtual reference station to be sent to the user machine, wherein before obtaining the IP address of the user machine connected to the Network RTK server, the method further comprises:

determining whether the user machine sends an actual position to the network RTK server;

when the user machine sends the actual position to the RTK server, determining, according to the actual position, a grid where the user machine is located; and determining the correction data of the virtual reference station according to the grid where the user machine is located, according to the actual position; and when the user machine does not send the actual position to the RTK server, triggering the process of obtaining the IP address of the user machine connected to the Network RTK server.

* * * * *